(12) United States Patent
Gregory

(10) Patent No.: US 6,240,219 B1
(45) Date of Patent: May 29, 2001

(54) APPARATUS AND METHOD FOR PROVIDING OPTICAL SENSORS WITH SUPER RESOLUTION

(75) Inventor: Donald David Gregory, Fort Wayne, IN (US)

(73) Assignee: ITT Industries Inc., White Plains, NY (US)

( * ) Notice: Subject to any disclaimer, the term of this patent is extended or adjusted under 35 U.S.C. 154(b) by 0 days.

(21) Appl. No.: 08/763,610

(22) Filed: Dec. 11, 1996

(51) Int. Cl.$^7$ ........................................... G06K 7/10
(52) U.S. Cl. ..................... 382/321; 235/454; 358/474
(58) Field of Search ................ 382/221; 356/139.01; 250/206.2, 548; 482/100, 138; 235/454; 358/474

(56) References Cited

U.S. PATENT DOCUMENTS

| | | | |
|---|---|---|---|
| 3,957,376 | 5/1976 | Charsky et al. | 356/106 R |
| 4,093,866 | 6/1978 | Kasdan et al. | 250/563 |
| 4,164,788 | 8/1979 | Jain | 364/515 |
| 4,532,548 | 7/1985 | Zwirn | 358/166 |
| 4,549,204 | 10/1985 | Bertero et al. | 358/93 |
| 4,801,202 | 1/1989 | Wilcox | 356/152 |
| 5,302,823 | 4/1994 | Franklin et al. | 250/252.1 |
| 5,402,227 | 3/1995 | Schuma | 356/318 |
| 5,825,043 | * 10/1998 | Suwa | 250/548 |

FOREIGN PATENT DOCUMENTS 99 12 1512   4/2000  (EP) ............................. G02B/27/58

OTHER PUBLICATIONS

J.B. Abbiss, et al., Superresolution Algorithms for a Modified Hopfield Neural Network, IEEE Transactions on Signal Processing, vol. 39, No. 7, pp. 1516–1523, Jul. 1991.

J.B. Abbiss, et al., Advanced Signal Processing Algorithms, Architectures, and Implementations II, SPIE–The International Society for Optical Engineering, vol. 1566, pp. 365–375, Jul. 24–26, 1991.

J.B Abbiss, et al., Fast Regularised Deconvolution in Optics and Radar, Paper presented at 3rd IMA Conference on Mathematics in Signal Processing, University of Warwick, Warwick, UK, Dec. 15–17, 1992.

* cited by examiner

Primary Examiner—Jose L. Couso
Assistant Examiner—Anh Hong Do

(57) ABSTRACT

An optical sensor is disclosed of the type typically including an optical system for focusing light onto a focal plane. The optical system having a predetermined Numerical aperture which provides a corresponding level of spatial resolution. The optical sensor also including detectors for converting the light focused onto the focal plane into electrical signals including imaging data. The optical sensor further including a processor which processes the imaging data in order to provide a desired level of spatial resolution which is substantially higher than the corresponding level of spatial resolution.

28 Claims, 9 Drawing Sheets

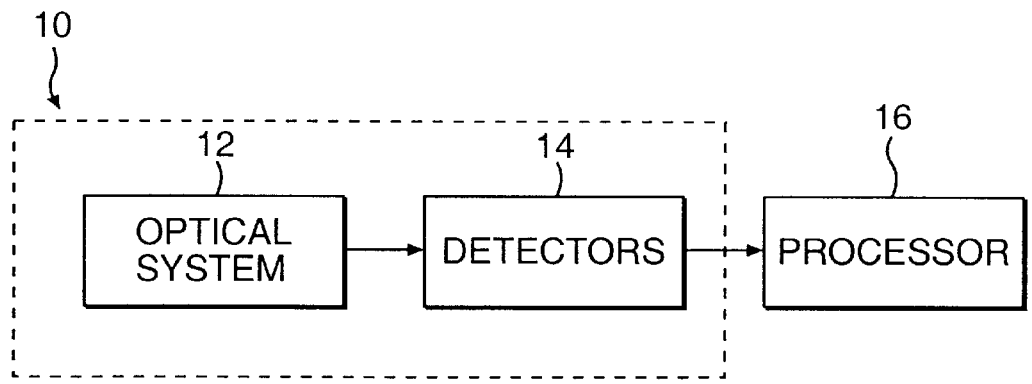
FIG. 1
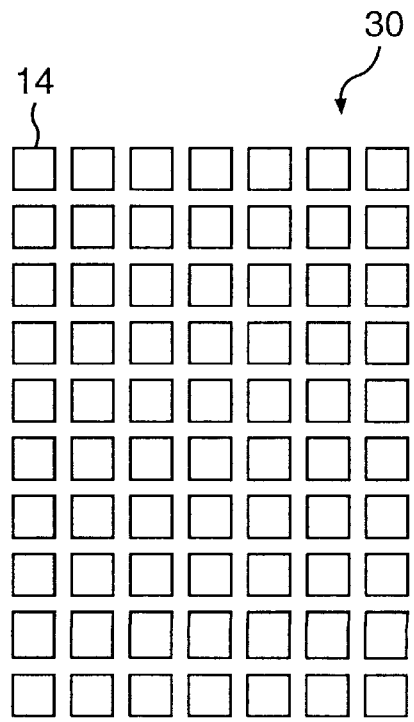
FIG. 2  FIG. 3

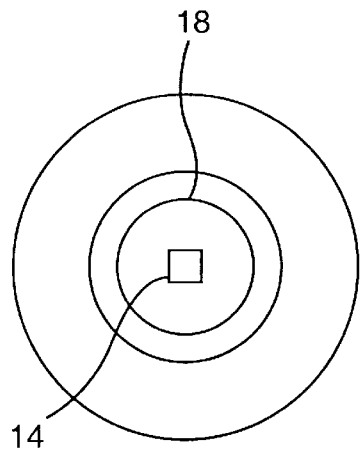
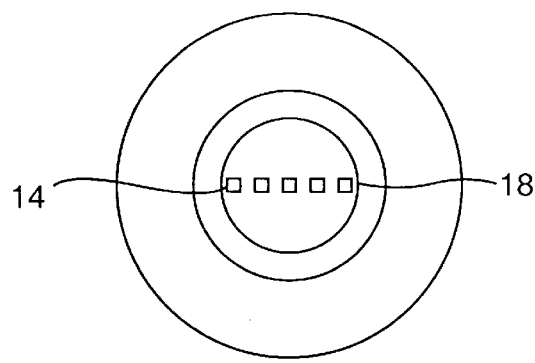
FIG. 4  FIG. 5
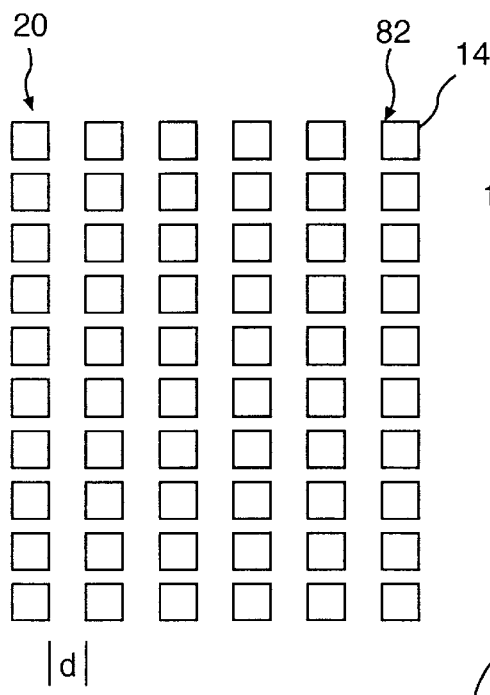
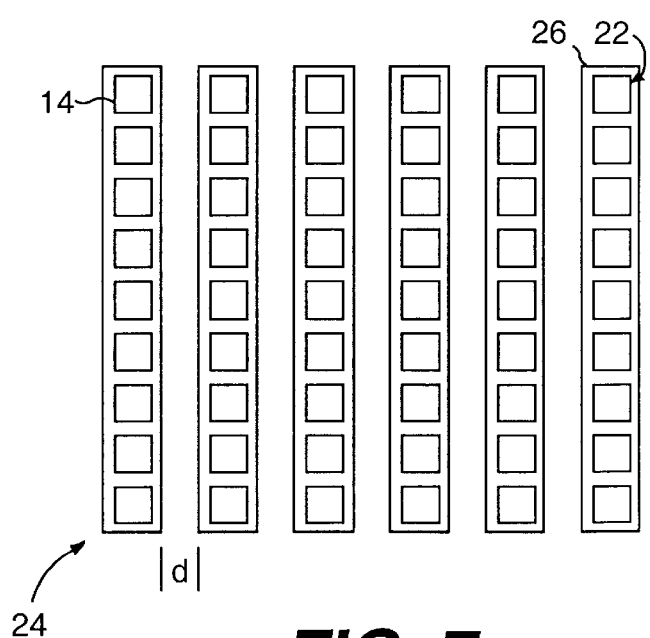
FIG. 6  FIG. 7

APPARATUS AND METHOD FOR PROVIDING OPTICAL SENSORS WITH SUPER RESOLUTION

BACKGROUND OF THE INVENTION

1. Field of the Invention

The present invention relates generally to optical devices, and more particularly to an optical sensor which is specifically configured to be utilized in conjunction with an image processing technique in order to provide a much higher level of resolution without significantly increasing the size of the sensor.

2. Description of the Prior Art

Optical sensors are devices which for decades have been utilized to detect and record various optical images. Various types of optical sensors have been developed which work in the the Ultra Violet Bands, Infra Red Bands as well as in the Visible Bands of operation. Examples of such devices include Weather Sensors, Terrain Mapping Sensors, Surveillance Sensors, Medical Probes, Telescopes and Television Cameras.

An optical sensor typically includes an optical system and one or more detectors. The optical system portion is made up of various combinations of lenses, mirrors and filters which is utilized to focus light onto a focal plane located at the image plane of the optical system. The detectors which make up the image plane is utilized to convert the light received from the optical system into electrical signals. Instead of detectors, other types of optical sensors utilize film to record the images. In this case, the grain size of the film is analogous to the detectors described above.

An important performance characteristic of optical sensors is known as "spacial resolution" which is the size of the smallest object that can be resolved in the image or equivalently is the ability to differentiate between closely spaced objects. If the optical system of these sensors are free from optical aberrations which means being "well corrected" the spacial resolution is ultimately limited by one of two factors. Either the resolution is limited by the size of the detectors in the focal plane or by diffraction effects.

Diffraction is a well known characteristic of light which among other things describes how light passes through an aperture of an optical system. Diffraction causes the light passing through an aperture to spread out which causes points of an image not to be a point, but rather a pattern of light known as a diffraction pattern diffused across a focal plane. For a well corrected unobscured optical system known as a diffraction limited system, the diffraction pattern includes a very bright central spot, surrounded by bright and dark rings of much less intensity which decreases in intensity as the distance from the ring to the central spot increases.

An optical sensor that is designed to be diffraction limited, typically, has a very well corrected optical system and detectors sized so that the central spot of the diffraction pattern just fits within the active area of the detector. Making the detectors any smaller does not serve any purpose and is considerably more costly due to the added cost of the extra detectors and the associated electronics The size of the aperture utilized in the optical system also is an important factor due to diffraction effects. The size of the aperture is expressed differently depending on the type of application. In applications such as camera lenses and telescope objectives, the aperture is normally expressed as a f-number which is the ratio of the effective focal length to the size of the clear aperture. In applications such as microscope objectives, the aperture is normally expressed as a Numerical aperture (NA) which is the index of refraction times the sine of the half angle of the cone of illumination. For a given focal length, a high f-number corresponds to a smaller aperture, while a higher Numerical aperture corresponds to a larger aperture.

A drawback with conventional optical sensors relates to the size of the aperture required for a given level of resolution. In order to increase the resolution of such devices, a larger aperture is required. In many situations, the use of such a system is very costly. This is because utilizing a larger aperture requires the use of a significantly larger optical system. The cost for larger systems which have apertures with diameters greater than one foot is proportional to the diameter of the aperture raised to a power of "x". The variable "x" typically ranges from 2.1 to 2.9 depending on a number of other particulars associated with the sensor such as its wave band, field of regard and field of view.

The consideration for the size of the optical sensor is particular relevant in systems that fly on some type of platform, either in space or in the air. Under such conditions, the sensor must be light weight, strong and capable of surviving the rigors of the flight environment. Thus, the cost of going to a larger optical system can be in the hundreds of millions of dollars for some of the larger and more sophisticated sensors. Further, the size of the sensor may also be limited by such practical considerations as the amount of weight or space the host rocket, plane, balloon or vehicle accommodates. In these situations, a larger system cannot be implemented regardless of the cost.

A number of optical imaging techniques have been developed which are directed at increasing spatial resolution. One such example attempts to increase the resolution of optical sensors by utilizing a condition known as sub-pixel resolution. In sub-pixel resolution, the optical system is limited in spacial resolution not by diffraction, but by the size of the detectors or pixels. In this case, a larger detector size is utilized to prevent a portion of the higher spatial frequencies of the image formed by the optical system from being observed. Thus, sub-pixel resolution attempts to reconstruct an image that includes these higher spatial frequencies which are already in the image. This technique does not attempt to reconstruct an image that is smaller than the diffraction limit, which is even smaller than the sub-pixel resolution. Further, this technique also does not require hardware or system operation changes in order to achieve sub-pixel reconstruction. Examples of sub-pixel resolution techniques are disclosed in an article ADVANCED SIGNAL PROCESSING ALGORITHMS, ARCHITECTURES AND IMPLEMENTATIONS II, by J. B. Abbiss et al., The International Society For Optical Engineering, Volume 1566, P. 365.

Other examples of optical imaging techniques are disclosed in another article entitled SUPERRRESOLUTION ALGORITHMS FOR A MODIFIED HOPFIELD NEURAL NETWORK, by J. B. Abbiss, IEEE Transactions On Signal Processing, Vol. 39, No. 7, July 1991 and in a paper entitled FAST REGULATED DECONVOLUTION IN OPTICS AND RADARS, by J. B. Abbiss, presented at the 3rd IMA Conference on Mathematics in Signal Processing. These techniques utilize linear equation and matrix techniques in order to restore signals or images from a limited discrete data set.

The previously described techniques have a number of drawbacks in regard to optical sensors. First of all, only one of these techniques is directed toward a diffraction limited device. Also, these techniques often produce forms of solutions which are not practically solved due to the constraints of computing power in airborne systems. This is because such solutions often yield large rounding errors and require a large number of operations. Further, none of the previously described techniques disclose either the types of detectors or other system parameters which are utilized along with these techniques.

It is therefore, an object of the present invention to provide a technique for optimally increasing the resolution of an optical sensor that is diffraction limited without utilizing a substantially larger aperture.

SUMMARY OF THE INVENTION

An optical sensor is disclosed of the type typically including an optical system for focusing light onto a focal plane. The optical system having a predetermined Numerical aperture which provides a corresponding level of spatial resolution. The optical sensor also including means for converting the light focused onto the focal plane into electrical signals including imaging data. The optical sensor further including means for processing the imaging data in order to provide a desired level of spatial resolution which is substantially higher than the corresponding level of spatial resolution.

It is also disclosed that the processing means utilizes a technique selected from the group consisting of a Linear Algebra Technique, a Multiple Image Reconstruction Technique, a Non-linear Reconstruction Technique, and a Non-linear Multiple Band Reconstruction Technique.

BRIEF DESCRIPTION OF THE DRAWING

The above objects, further features and advantages of the present invention are described in detail below in conjunction with the drawings, of which:

FIG. 1 is a general block diagram of the optical sensor according to the present invention;

FIG. 2 is a diagram of a linear detector array according to the present invention;

FIG. 3 is a diagram of a matrix detector array according to the present invention;

FIG. 4 is a diagram illustrating the size of an individual detector according to the present invention;

FIG. 5 is a diagram illustrating that more than one detector is spread across the central diffraction lobe according to the present invention;

FIG. 6 is a diagram of a multi-linear detector array according to the present invention;

FIG. 7 is a diagram of another embodiment of a multi-linear detector array according to the present invention;

DETAILED DESCRIPTION OF THE DRAWING

Figure 8:
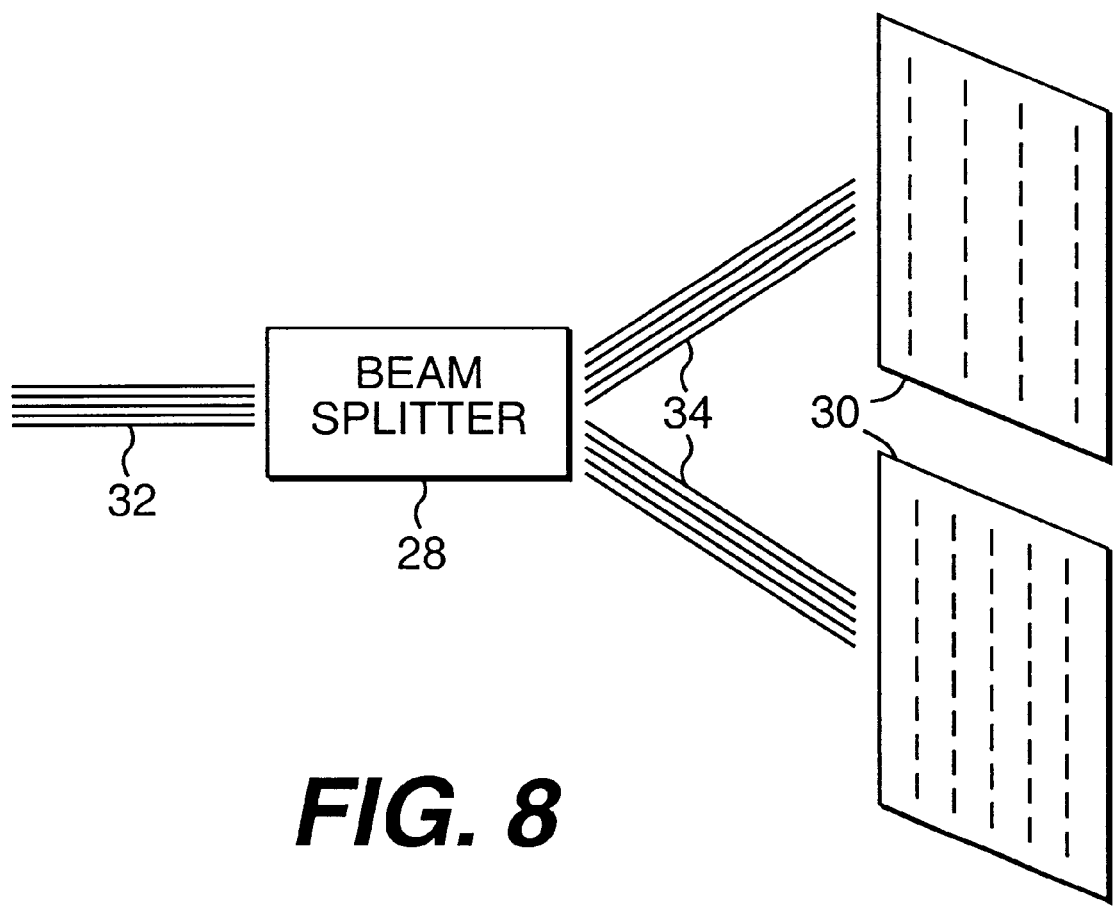
FIG. 8 is diagram illustrating the operation of a beam splitter included into the optical system according to the present invention.

The present invention is directed to an optical sensor which overcomes the difficulty of requiring larger apertures in order to achieve resolutions below the diffraction limit. This is accomplished by utilizing a sensor configuration which is optimized to be utilized in conjunction with an image processing technique that recovers the "lost" information due to diffraction blurring.

Referring to FIG. 1, there is shown a general block diagram of the optical sensor according to the present invention. The sensor 10 as in conventional devices includes an optical system 12 and detectors 14. The optical system 12 which includes various combinations of lenses, mirrors and filters depending on the type of application is utilized to focus light onto a focal plane where the detectors 14 are located. The optical system 12 also includes a predetermined aperture size corresponding to a particular Numeral aperture (NA) which in conventional diffraction limited devices limits the amount of spacial resolution that is attainable. As previously described, this is due to diffraction blurring effects.

The detectors 14 are utilized to convert the light received from the optical system 12 into electrical signals which includes the imaging data utilized to generate images. In conventional sensors, the detectors are configured in a linear array for Scanning systems or in a matrix array for Starring systems. In Scanning systems, the detector linear array is swept in a direction perpendicular to the length of the array which generates imaging data one scan line at a time which corresponds to one line of the image. In Starring systems, the matrix array is not moved and generates all of the imaging data for the image simultaneously. Thus, each detector of the matrix array corresponds to one pixel of the image. It is intended that the detectors 14 of the present invention are also configurable as a linear array or a matrix array depending on the type of system being utilized.

The detectors 14 are also capable of being embodied by a number of different type of devices depending on the wavelength of light utilized by the present invention. For example, in the ultraviolet and X-Ray range such detectors as semitransparent photocathodes and opaque photocathodes are capable of being utilized. In the visible range, such detectors include vacuum phototubes, photomultipliers, photoconductors and photodiodes. While in the infrared range, such detectors also include photoconductors, photodiodes, pryoelectric, photon drag and golay cells devices.

Further, in the present invention various elements of the sensor 10 are required to be optimized in order to be utilized in conjunction with a particular image processing technique. How these elements are optimized depends on the image processing technique that is being utilized. As will be described in detail later, the present invention includes five alternative image processing techniques.

In a first case, the sensor 10 must include detectors 14 that have an "instantanous field of view" that is equal or less than the desired level of spacial resolution. Thus, if the required resolution is one meter or less, then the "instantanous field of view" of the detectors must corespond to one meter or less, even though the central lobe of the diffraction pattern is much larger. This makes the pixel size of the image produced by the sensor 10 smaller than the central diffraction lobe. Such a configuration adds additional cost to the sensors. However, for large systems the increase in cost is less than the cost of a larger system.

The sensor 10 can be configured according to Case one in one of two ways. One way is to utilize a larger amount of detectors 14 and a smaller size of detectors 14. In conventional sensors, the number of detectors utilized varies any where from one to thousands or to millions depending on the type of application.

In the present invention, three to five times more detectors 14 than normal are required in order to achieve the higher resolution. A diagram of a linear detector array according to the present invention is shown in FIG. 2, while a diagram of a matrix detector array according to the present invention is shown in FIG. 3. The number of detectors 14 included in these arrays 28, 30 depends on the particular application. However, in order to achieve the higher resolution, these arrays 28, 38 will include three to five times more detectors 14 than conventional sensors for a given application.

In conventional sensors, the size of the individual detector is never smaller than size of the central diffraction lobe. This is because utilizing smaller sensors serves no purpose due to the resolution being limited by the optical aperture. In the present invention, the size of the individual detectors 14 are smaller than the size of the central diffraction lobe 18, as shown in FIG. 4.

Another way of configuring the sensor 10 according to Case one is to again utilize a larger number of detectors 14, but instead of utilizing smaller detectors, configure the optical system 12 so that more than one detector is spread across the central diffraction lobe. This enables conventional size detectors 14 to be utilized. The number of detectors 14 utilized again ranges from three to five times more than required in conventional sensors for similar applications. In order to configure the optical system 12 as described above, it is preferable that the back focal length of the optical system 12 is adjusted, which is a well known procedure. It is also preferable, that the back focal length is adjusted so that five or more detectors 14 spread across the central diffraction lobe 18, as shown in FIG. 5.

In a second case, the sensor 10 is configured to take multiple images of objects in a known pattern that moves each image by a known amount. This is accomplished by the sensor 10 viewing the object at different angles, wherein each image of the object corresponds to a different angle. The viewing at different angles is accomplished by the movement of the sensor 10 induced by jitter in the spacecraft or vehicle. This also is accomplished by jitter induced by a mirror included in the optical system 12.

In Scanning systems, it is preferable not to generate multiple image data by viewing the object at different times. This is because it requires that the object remain stationary while the different images are being taken. Thus, it is preferable to utilize detectors 14 configured in a multi-linear array as shown in FIG. 6. The multi-linear array 20 includes a number of individual linear arrays 22 arranged in a parallel configuration staggered apart by a distance (d) which is a fraction of a pixel. When the array 20 is swept, each linear array 22 generates imaging data corresponding to one scan line of each of the images. Thus, each linear array 22 corresponds to one of the images being produced. In the preferred embodiment, the array 20 includes ten or more individual linear arrays 22 which are capable of producing ten or more different images.

In a third case, the sensor 10 is configured to take images of objects in multiple color bands. In Scanning systems, this is again accomplished by utilizing a multi-linear array, as shown in FIG. 7. The multi-linear array 24 also includes a number of individual linear arrays 22 arranged in a parallel configuration staggered apart by a distance (d) which is a fraction of a pixel. However, a color filter 26 is disposed over each of the linear arrays 22. The color filters 26 are configured to pass only a particular portion of the color spectrum which may include one or more different wavelengths of visible light. When the array 24 is swept, each linear array 22 produces images of the same object in different color bands. The filters 26 are fabricated by disposing layers of optical coatings on transparent substrates, which are then placed over each of the linear arrays 22, which is a well known process.

In Starring systems, the multiple color band imaging data is accomplished by incorporating a beam splitter in the optical system 12 and utilizing more than one detector matrix array. Such a configuration is illustrated by the diagram of FIG. 8. The beam splitter 28 is utilized to split the incoming light 32 into multiple light beams 34 which in this case is two. Due to the operation of the beam splitter 28 each of the light beams 34 includes a different portion of the color spectrum which may include one or more different wavelengths of visible or infrared light. Each light beam is then directed to one of the detector arrays 30 which produces the images of the same object in different color bands.

In a fourth case, the sensor 10 is configured to have a combination of the three previously described cases. This is accomplished by combining the principles discussed in regard to Case one, two or three. In regard to all of the cases previously described, the sensor must be configured to have a signal to noise ratio which is high as possible. This is accomplished by either increasing the integration time of the detectors 14 or by slowing down the scan speed as much as possible for scanning systems. For case two, the system's design or its operation mode, or both are changed in order to take the required multiple images in a known pattern displaced by a known distance that is not a multiple of a pixel, but rather is a multiple of a pixel plus a known fraction of a pixel.

Referring back to FIG. 1, coupled to the detectors 14 is a processor 16 which is utilized to process the imaging data in order to attain the higher resolution. The processing includes recovering "lost" information from the imaging data which is utilized to provide the higher resolution. Even though the diffraction blur destroys the required spacial resolution, some of the "lost" spacial information still exists spread across the focal plane. Over sampling the diffraction blur in conjunction with processing the data correctly, enables much of this "lost" information to be recovered and thus enables the image to be restored to a higher spacial resolution than classical diffraction would allow.

The processor 16 accomplishes the above described processing by utilizing one of five alternative image processing techniques including a Linear Algebra Technique, Multiple Image Reconstruction Technique, Non-linear Reconstruction Technique, Non-linear Multiple Band Reconstruction Technique and various combinations of the above four techniques. Which of the above techniques is utilized by the processor 16, determines how the sensor 10 according to the present invention is configured.

For the Linear Algebra Technique, Non-linear Reconstruction Technique and Non-linear Multiple Band Reconstruction Technique, the sensor 10 must be configured according to Case one. For the Non-linear Multiple Band Reconstruction Technique, the sensor 10 must also be configured according to Case three. For the Multiple Image Reconstruction Technique, the sensor 10 only has to be configured according to Case two. However, in order to achieve better results with Multiple Image Reconstruction Technique, it is preferred that the sensor 10 is also configured according to Case one.

One reasonable extension of the previously described imaging techniques is to utilize phase retrieval or wave front phase information to reconstruct the image and thus achieve the higher resolution. Another reasonable extension of the previously described technique is to utilize prior knowledge of the background scene of interest to help resolve objects that have recently moved into the scene. The processor 16 in addition to utilizing one of the above described primary data processing techniques, also utilizes other techniques to further process the imaging data. This further processing is accomplished by standard image enhancement techniques which are further utilized to improve the reconstructed image. Such techniques include, but are not limited to edge sharpening, contrast stretching or contrast enhancement techniques.

The Linear Algebra Technique is based on the following principles:
The action of Point Spread Function on an Object Vector (f) is represented by a Matrix (A) which are utilized to get a Resulting Smoothed Image Vector (g), where g is represented by the following formula;

$$g = Af \quad (1)$$

The Matrix (A) gives the result of a 2-D Convolution of the Point Spread Function with the Object Vector (f) when it operates on the Object Vector. The Matrix (A) Transforms the Ideal Object Vector (f) to the Image Vector (g) which is actually obtained by the sensor. The Image Vector (g) is expressed by:

$$g_k = \sum_i A_{ki} f_i \quad (2)$$

In an actual sensor, the signal produced by the detectors is the real image plus the noise $(g_j + n_j)$, where $n_j$ equals the noise of the jth pixel. Thus, the signal is rougher than the image (g). In addition, $A^{-1}$ must be anti-smoothing, which consequently makes the geometric optics prediction "$f = A^{-1}(g+n)$" extremely rough and very inaccurate. Further, the noise prevents the use of $A^{-1}$ to get f from a real signal. This kind of problem is said to be "ill-posed".

In order to overcome the difficulty with noise, a Linear Algebra Technique has been developed that utilizes a regularization parameter ($\alpha$) to estimate the Object Vector (f), which includes the following steps:

Define f' to be the estimated Object vector and g' to be the Measured Signal Vector which is equal to g+n.

Bound f' so that it cannot get to large. For example, let E=the maximum signal energy, then $\|f'\|^2 \leq E^2$.

Place a bound on the expected noise error, $\|Af'-g'\|^2 \leq \epsilon^2$.

Then f' is the vector which makes both non-negative real numbers $\|f'\|^2$ and $\|Af'-g'\|^2$ as small as possible.

Define f' to be a vector which minimizes $\|Af'-g'\|^2/\epsilon^2 + \|f'\|^2/E^2 = (1/\epsilon)^2[\|Af'-g'\|^2 + \alpha\|f'\|^2]$, where $\alpha = \epsilon^2/E^2$.

Thus, it can be shown that $f' = [A^T A + \alpha]^{-1} A^T g$, which is the classical form of the solution. The size of $\alpha$ chosen specifies the relative importance of removing the effects of noise from the estimate f'. When $\alpha$ is small ($\epsilon^2 << E^2$), little noise is expected in g'. When $\alpha$ is large, much noise is expected in g'.

The above described Linear Algebra Technique is not the preferred way of calculating f'. This is because the expression $f' = [A^T A + \alpha]^{-1} A^T g'$ is not in a useful form for calculating f' due to large rounding errors and the large number of mathematical operations required. In order to overcome these difficulties, the problem has to be recast into a different form, which will now be described in conjunction with FIG. 9.

Figure 9:
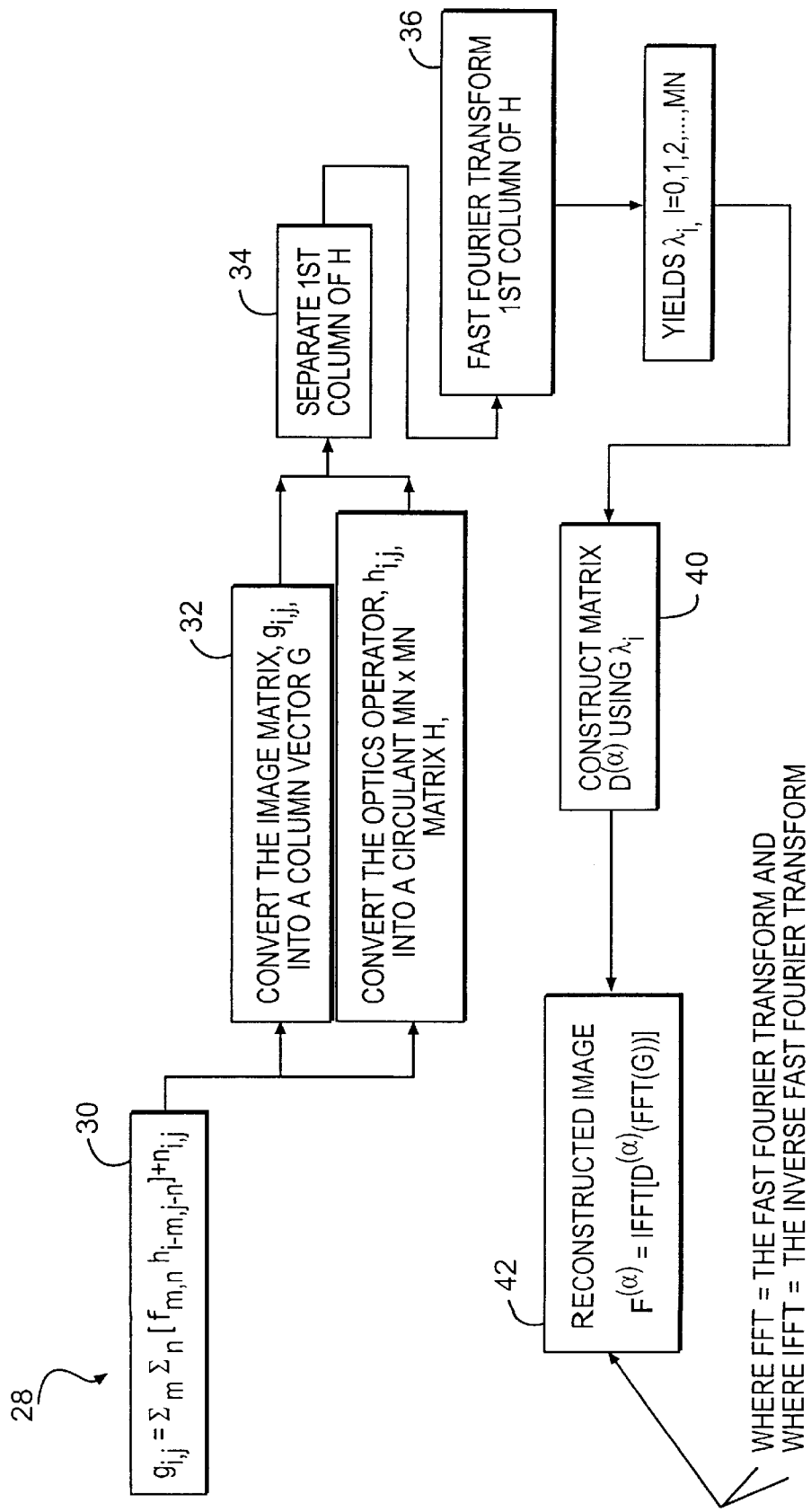
FIG. 9 is a flow diagram of the Linear Algebra Technique according to the present invention.

Referring to FIG. 9, a flow diagram of the Linear Algebra Technique according to the present invention is shown. The technique 28 first converts the imaging data collected by the optical system of the sensor into an Imaging Matrix of the form $$g_{i,j} = \sum_m \sum_n f_{m,n} h_{i-m, j-n} + n_{i,j} \, 30,$$

where $g_{i,j}$ represents the blurred noisy image, $f_{i,j}$ is a matrix representation of the object, $h_{i,j}$ is a matrix representation of the point spread function of the optical system and $n_{i,j}$ is a matrix representation of the noise associated with the imaging data.

Figure 10:
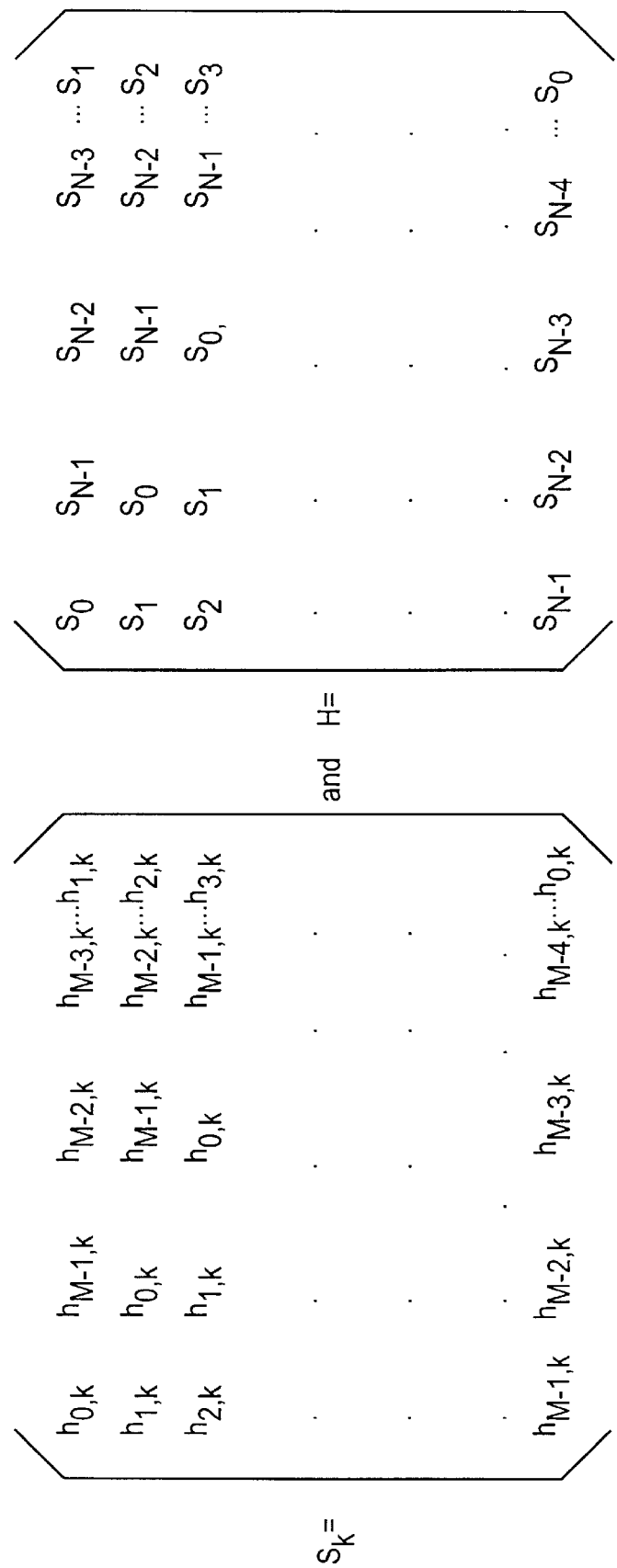
FIG. 10 is a diagram illustrating the form of the matrix H utilized in the Linear Algebra Technique according to the present invention.

Next, the Image Matrix $g_{i,j}$ is converted into a column vector G 32. This is accomplished by converting both matrices $f_{i,j}$ and $n_{i,j}$ into column vectors by the method known as "Column stacking". Converting the matrix $g_{i,j}$ into the column vector G 32 results in the Optics Operator Matrix $h_{i,j}$ being converted into a Circulant MN×MN matrix H. The Circulant Matrix H is defined by a list of sub-matrices $S_k$ having the form as shown in FIG. 10.

Still Referring to FIG. 9, after step 32, the $1^{st}$ column of the matrix H is separated 34 which then enables a Fast Fourier Transform to be performed on the $1^{st}$ column of H 36. Taking the Fast Fourier Transform 36 yields a complex 1×MN vector $\lambda_i$, where i=0, 1, 2, . . . , MN−1 38. Next, the Matrix $D^{(\alpha)}$ is constructed by utilizing the vector $\lambda_i$ 40. $D^{(\alpha)}$ is a diagonal MN×MN matrix which is constructed by making its diagonal elements equal to a vector $L_i^{(\alpha)}$ and all other elements equal to zero, where $L_i^{(\alpha)} = \lambda_i^*/\{|\lambda_i|^2 + \alpha\}$ and $\lambda_i^*$ is the complex conjugate of $\lambda_i$.

Finally, the reconstructed image ($F^{(\alpha)}$) is formed 42 by the following expression:

$$F^{(\alpha)} = IFFT[D^{(\alpha)}(FFT(G))] \quad (3)$$

where FFT is a Fast Fourier Transform and IFFT is an inverse Fourier Transform. The reconstructed image ($F^{(\alpha)}$) includes much of the lost spacial resolution which was lost due to diffraction blurring effects.

Figure 11:
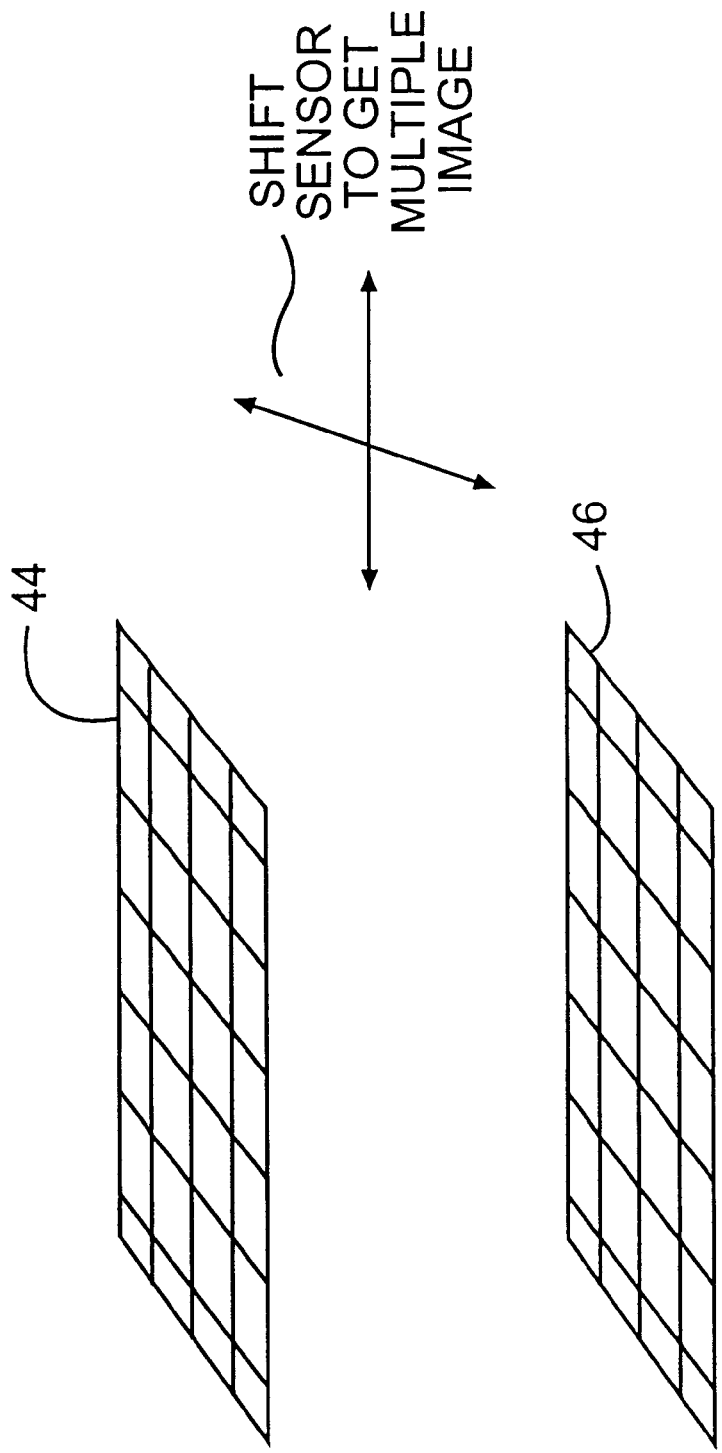
FIG. 11 is a diagram illustrating the Multiple Image Reconstruction Technique according to the present invention.

Referring to FIG. 11, there is shown a diagram illustrating the Multiple Image Reconstruction Technique according to the present invention. This technique involves taking N shifted images of a mixel grid 46 utilizing a pixel grid 44 which has been shifted against the mixel grid 46 by a known pattern of sub-pixel distances. The pixel grid 44 represents the image of the object. Each pixel is equal to the corresponding detector IFOV's, while the mixel grid 46 is a representation of the object at the desired resolution.

The pixel intensity ($I_{p,i}$) is calculated for each pixel of the pixel grid 44 by the following expression:

$$I_{p,i} = \sum_m W_{m,p,i} I_m, \quad (4)$$

where p represents the $p^{th}$ pixel, i represents the $i^{th}$ image, $I_m$ is the intensity of the of the $m^{th}$ mixel and $W_{m,p,i}$ is a weighting function based on the point spread function of the optical system and any associated atmospheric transmittance. It should be noted, that $I_m$ is unknown and is solved by an iteration process. This iteration process includes making an initial guess for $I_m$ and then converging $I_m$ to the lowest error value.

Figure 12:
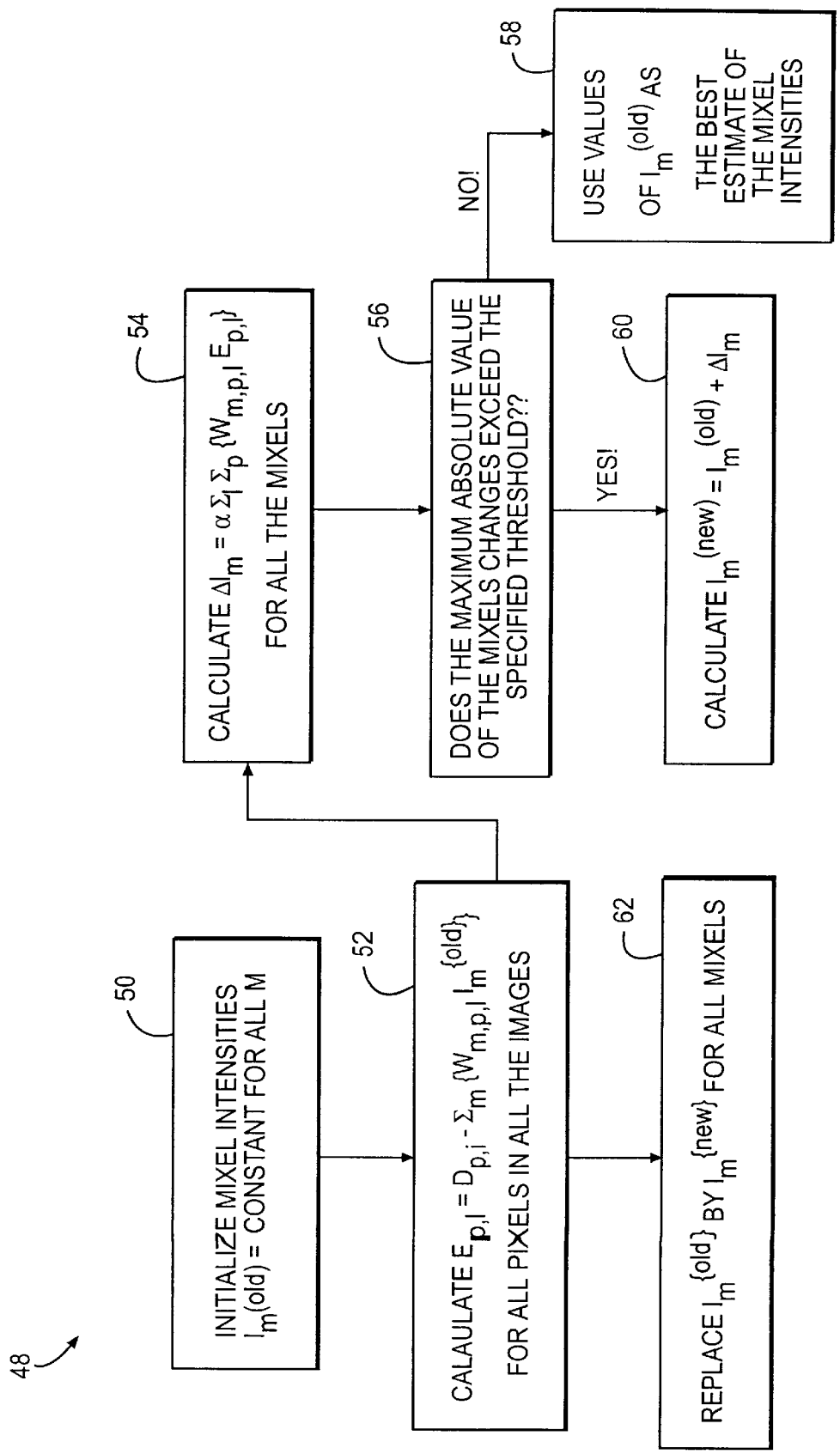
FIG. 12 is a flow diagram of the Multiple Image Reconstruction Technique according to the present invention.

Referring to FIG. 12, a flow diagram of the Multiple Image Reconstruction Technique according to the present invention is shown. The technique 48 first initializes the mixel intensities and equates the values with a parameter $I_m^{(old)}$ 50. At this point in the technique, the mixel intensities $I_m^{(old)}$ are constant for all m and as previously described are an initial guess. Next, $$E_{p,i} = D_{p,i} - \sum_m \{W_{m,p,i} I_m^{(old)}\}$$

is calculated for all pixels in all of the images 52. Where $E_{p,i}$ represents the intensity difference of the $p^{th}$ pixel in the $i^{th}$ image between $D_{p,i}$, which is equal to the measured intensity including the noise of the $p^{th}$ pixel in the $i^{th}$ image, and the contribution of the current estimate of the intensities of the mixels $I_m^{(old)}$.

Then $$\Delta I_m = \alpha \sum_i \sum_p \{W_{m,p,i} E_{p,i}\}$$

is calculated for all mixels 54. Where $\Delta I_m$ is the estimate of how much to change the initial mixel intensity which has been equated to $I_m^{(old)}$ and $\alpha$ is an empirically chosen "convergence" parameter. Next, the technique checks to see if the maximum absolute value of the mixel changes ($\Delta I_m$) exceed the specified threshold? 56. If $\Delta I_m$ does not exceed the threshold, the values of $I_m^{(old)}$ are used as the best estimate of the mixel intensities.

If $\Delta I_m$ does exceed the threshold, then $I_m^{(new)} = I_m^{(old)} + \Delta I_m$ is calculated 60, where $I_m^{(new)}$ represents new values for the mixel intensities which were calculated utilizing $\Delta I_m$. Next, replace $I_m^{(old)}$ by $I_m^{(new)}$ for all mixels 62. Replacing $I_m^{(old)}$ by $I_m^{(new)}$ 62 equates the new values for the mixel intensities with $I_m^{(old)}$ which enables steps 52, 54, 56, 58, 60 to be repeated for these new values. This loop will be continually repeated until the values of the mixel changes ($\Delta I_m$) exceed the specified threshold as specified in step 56.

The Non-Linear Reconstruction Technique utilizes a probability density function technique based upon the Poisson Distribution which seeks to maximize its log by utilizing an iterative process. The image model is given by the following expression:

$$I_{p,i} = \sum_m W_{m,p,i} I_m, \quad (4)$$

where S(i) is the vector utilized to generate the object data for i=1, 2, 3, ... N. Then $e^{s(i)}$ is the intensity of the ith object pixel. Further, h(j) is the vector function derived from the system's point spread function, while I(j) is the intensity of the jth image pixel without noise.

Figure 13:
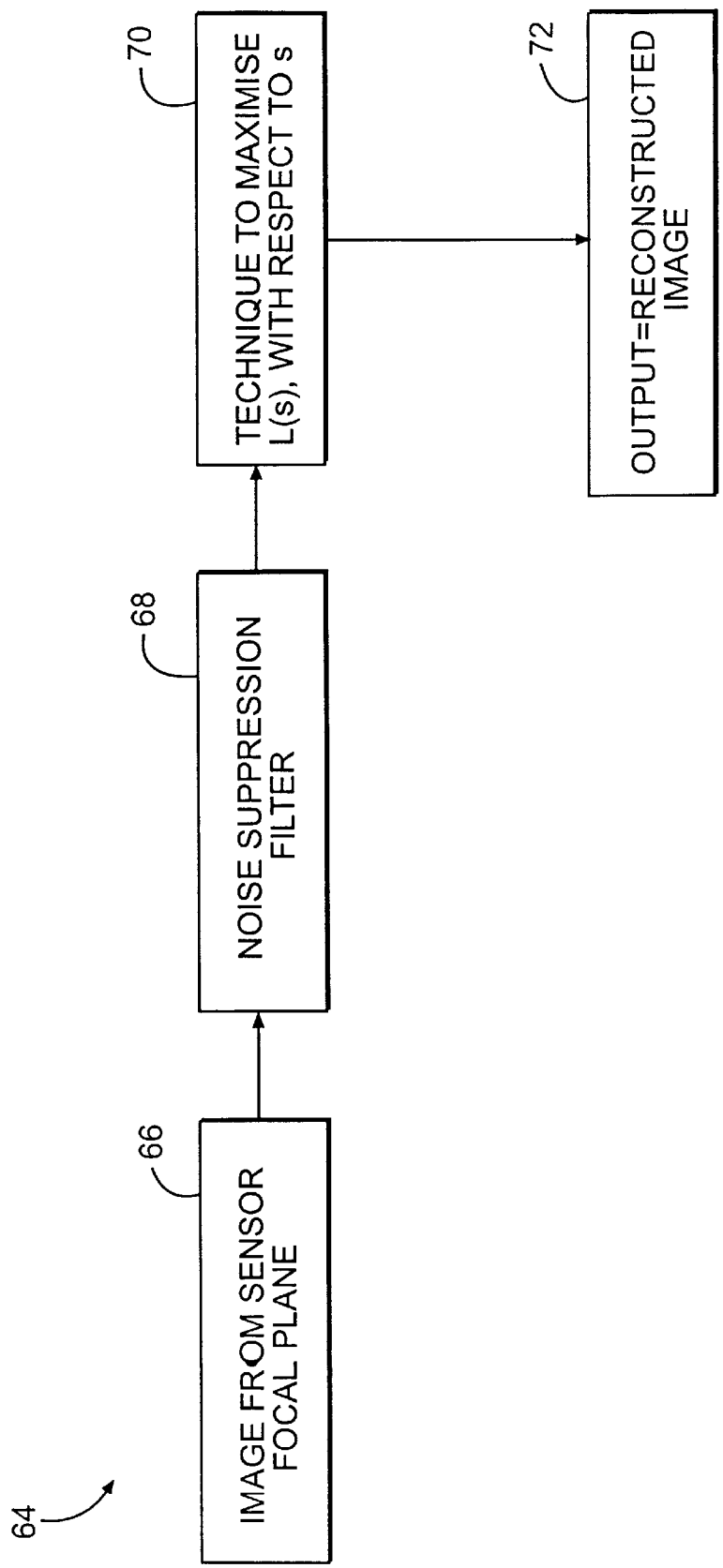
FIG. 13 is a flow diagram of the Non-Linear Reconstruction Technique according to the present invention.

Referring to FIG. 13, there is shown a flow diagram of the Non-Linear Reconstruction Technique according to the present invention. First the image from the sensor focal plane 66 is produced, where the image is expressed by D(j) which is I(j) (Expression 4) corrupted by noise. D(j) represents the actual data measured by the sensor. Next, a noise suppression filter 68 is utilized to eliminate the noise which is measured by the sensors. After filtering out the noise 68, a Technique to maximize L(s) with respect to S 70 is utilized to produce an output equal to the reconstructed image 72. The expression L(s) is the logarithm of the probability density function which is expressed by:

$$L(s) = \sum_j \{D(j)\ln(I(j)) - I(j)\} \quad (5)$$

In order to accomplish step 70, the values for the particular S(i)'s must be found which maximize the expression L(s). There are several techniques that can be utilized to accomplish this maximizing. One such technique involves taking the derivative of L(s) with respect to S and then setting it equal to zero. This technique leads to an expression that is similar to an integral equation. Applying Piquard's method of iteration leads to the following iterative expression:

$$S^{(new)}(i) = S^{(old)}(i) + \ln\left\{\sum_j h(j-i)D(j)/I^{(old)}(j)\right\} - \ln\{k\}, \quad (6)$$

where $$\ln\{K\} = \sum_j h(j-i).$$

As previously mentioned, there are other techniques available to perform the maximizing of L(s).

The Non-Linear Multiple Band Reconstruction Technique involves combining images in different color bands of the same object in order to reproduce the image in the desired spatial resolution. As previously described, the different images are produced by modifying the sensor of the present invention according to Case three. This technique is similar to the previously described Non-Linear Reconstruction Technique, except that multi-band imaging data is utilized. The Non-Linear Multiple Band Reconstruction Technique also utilizes a probability density function technique based the Poisson Distribution which seeks to maximize its log by utilizing an iterative process. The image model is given by the following expression:

$$I_K(j) = \sum_j h(j-i) e^{S(i)}, \quad (7)$$

where the multiple bands are denoted by K and S(i) is the vector utilized to generate the object data for i=1, 2, 3, ... N. Then $e^{s(i)}$ is the intensity of the ith object pixel. Further, $h_k(j)$ is the vector function derived from the system's point spread function for the $K^{th}$ band, while I(j) is the intensity of the jth image pixel in the $K^{th}$ band without noise.

Figure 14:
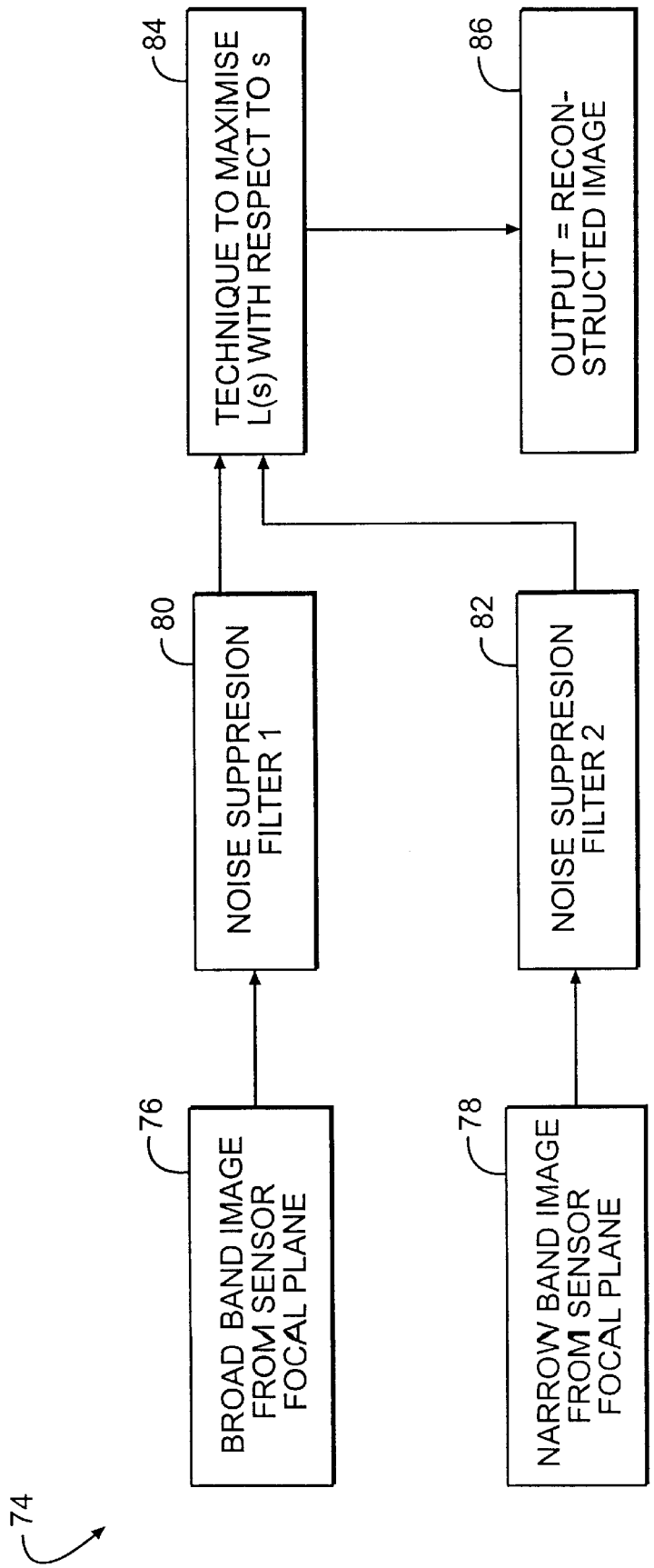
FIG. 14 is a flow diagram of the Non-linear Multiple Band Reconstruction Technique according to the present invention.

Referring to FIG. 14, a flow diagram of the Non-Linear Multiple Band Reconstruction Technique according to the present invention. First the broad band and narrow images from the sensor focal plane 76, 78 is produced, where the image is expressed by $D_K(j)$ which is $I_K(j)$ (Expression 4) corrupted by noise. D(j) represents the actual multi-band imaging data measured by the sensor. Next, noise suppression filters 80, 82 are utilized to eliminate the noise in both the narrow and broad bands.

After filtering out the noise 80, 82, both bands are combined and then processed by a Technique to maximize L(s) with respect to S 84 to produce an output equal to the reconstructed image 86. The expression L(s) is the logarithm of the probability density function which is expressed by:

$$L(s) = \sum_k \sum_j \{D_k(j)\ln(I_K(j)) - I_K(j)\} \qquad (8)$$

In order to accomplish step 84, the values for the particular S(i)'s must be found which maximize the expression L(s). This is the same problem described in the Non-Linear Reconstruction Technique and can be solved in a similar manner.

It should be noted that the present invention is not limited to any one type of optical sensor device. The principles which have been described herein apply to many types of applications which include, but are not limited to Optical Earth Resource Observation Systems (both Air and Spaceborne), Optical Weather Sensors (both Air and Spaceborne), Terrain Mapping Sensors (both Air and Spaceborne), Surveillance Sensors (both Air and Spaceborne), Optical Phenomenology Systems (both Air and Spaceborne), Imaging Systems that utilize optical fibers such as Medical Probes, Commercial Optical Systems such as Television Cameras, Telescopes utilized for astronomy and Optical Systems utilized for Police and Rescue Work.

While the invention has been particularly shown and described with reference to preferred embodiments thereof, it will be understood by those skilled in the art that changes in form and details may be made therein without departing from the spirit and scope of the present invention.

What is claimed is:

1. An optical sensor of the type typically including an optical system for focusing light onto a focal plane, said optical system having a predetermined Numerical aperture which provides a corresponding level of spatial resolution, wherein the improvement therewith comprising:
   means for converting the light focused on said focal plane into electrical signals including imaging data; and
   means for processing said imaging data in order to provide a desired level of spatial resolution which is substantially higher than said corresponding level of spatial resolution;
   wherein said means for processing utilizes a Linear Algebra Technique, wherein said Linear Algebra Technique utilizes the relationship $$F^{(\alpha)} = \text{IFFT}[D^\alpha(\text{FFT}(G))]$$

where FFT(G) is a Fast Fourier Transform of an imaging vector derived from said imaging data and IFFT[D$^\alpha$(FFT (G))] is an inverse Fast Fourier Transform of a function comprised of said Fast Fourier Transform and a matrix representing the point spread function of said corresponding aperture, which is derived from said imaging data.

2. The sensor according to claim 1, wherein said converting means include a plurality of detectors each having an "instantanous field of view" that is less than said desired level of spatial resolution.

3. The sensor according to claim 2, wherein said plurality of detectors includes three to five more times the amount of detectors utilized in conventional sensors for a given application.

4. The sensor according to claim 2, wherein each of said detectors has a size no greater than the central diffraction lobe produced by said predetermined Numerical aperture.

5. The sensor according to claim 2, wherein said optical system has a back focal length which is adjusted to enable more than one of said detectors to be spread across the central diffraction lobe produced by said predetermined Numerical aperture.

6. The sensor according to claim 2, wherein said detectors are arranged in a configuration selected from the group consisting of a linear array, a multi-linear array and a matrix array.

7. The sensor according to claim 1 wherein said means for converting the light focused on said focal plane into electrical signals comprises a detector array having at least five detectors spread across the central lobe of the diffraction pattern.

8. A method for substantially increasing the spatial resolution of imaging data produced by a diffraction limited optical system, said method comprising the steps of:
   converting said imaging data into an Imaging Matrix ($g_{i,j}$);
   converting said Image Matrix ($g_{i,j}$) into a Column Vector (G) including a Circulant Matrix (H);
   separating a column from said Circulant Matrix (H);
   performing a Fast Fourier Transform on said column to produce a vector ($\lambda_i$);
   constructing a Diagonal Matrix ($D^{(\alpha)}$) utilizing said vector ($\lambda_i$); and
   forming a reconstructed image by the following expression:

$$F^{(\alpha)} = \text{IFFT}[D^{(\alpha)}(\text{FFT}(G))],$$

where FFT is a Fast Fourier Transform and IFFT is an inverse Fourier Transform.

9. The method according to claim 8, wherein said Imaging Matrix ($g_{i,j}$) is expressed by:

$$g_{i,j} = \sum_m \sum_n f_{m,n} h_{i-m,j-n} + n_{i,j},$$

where $g_{i,j}$ represents the blurred noisy image, $f_{i,j}$ is a matrix representation of the object, $h_{i,j}$ is a matrix representation the point spread function of the optical system and $n_{i,j}$ is a matrix representation of the noise associated with said imaging data.

10. The method according to claim 8, wherein said column is a first column of said Circulant Matrix (H).

11. The method according to claim 8, wherein said Diagonal Matrix ($D^{(\alpha)}$) is constructed by making the diagonal elements of $D^{(\alpha)}$ equal to a vector $L_i^{(\alpha)}$ and all other elements equal to zero, where $L_i^{(\alpha)} = \lambda_i^* / \{|\lambda_i|^2 + \alpha\}$ and $\lambda_i^*$ is the complex conjugate of $\lambda_i$.

12. A method for substantially increasing the spatial resolution of imaging data produced by a diffraction limited optical system, said method comprising the steps of:
   detecting light focused on a focal plane of an optical sensor and generating image data indicative of multiple images of an object from said focused light, said image data represented by a pixel grid;
   providing an initial value for mixel intensities associated with a mixel grid representative of the object at a desired resolution which is equated to $I_m^{(old)}$ wherein said mixel grid corresponds to said pixel grid shifted according to a pattern of subpixel distances;
   calculating pixel energy for all of the images ($E_{p,i}$) by utilizing $I_m^{(old)}$;
   calculating changes in mixel intensities ($\Delta I_m$) by utilizing $E_{p,i}$;
   utilizing the values of $I_m^{(old)}$ as the estimate of the mixel intensities, if said changes in mixel intensities ($\Delta I_m$) does not exceed a specified threshold;

calculating new mixel intensities ($I_m^{(new)}$) by adding $\Delta I_m$ to $I_m^{(old)}$, if said changes in mixel intensities ($\Delta I_m$) does exceed said specified threshold; and equating $I_m^{(old)}$ with said new mixel intensities ($I_m^{(new)}$) to produce imaging data having increased spatial resolution.

13. The method according to claim 12, wherein said pixel energy for all of the images ($E_{p,i}$) is calculated by:

$$E_{p,i} = D_{p,i} - \sum_m \{W_{m,p,i} I_m^{(old)}\},$$

where $D_{p,i}$ is the measured intensity including noise of the $p^{th}$ pixel in the $i^{th}$ image and $W_{m,p,i}$ is a weighting function based on a point spread function of said optical system and any associated atmospheric transmittance.

14. The method according to claim 12, wherein said changes in mixel intensities ($\Delta I_m$) is calculated by:

$$\Delta I_m = \alpha \sum_i \sum_p \{W_{m,p,i} E_{p,i}\},$$

where $\alpha$ is an empirically chosen "convergence" parameter and $W_{m,p,i}$ is a weighting function based on a point spread function of said optical system and any associated atmospheric transmittance.

15. An optical sensor of the type typically including an optical system for focusing light onto a focal plane, said optical system having a predetermined numerical aperture which provides a corresponding level of spatial resolution, wherein the improvement therewith comprising:
  means for converting the light focused on said focal plane into electrical signals including imaging data; and
  means for processing said imaging data in order to provide a desired level of spatial resolution is substantially higher than said corresponding level of spatial resolution according to a linear algebra technique including:
    converting said imaging data into an Imaging Matrix ($g_{i,j}$);
    converting said Image Matrix ($g_{i,j}$) into a Column Vector (g) including a Circulant Matrix (H);
    separating a column from said Circulant Matrix (H);
    performing a Fast Fourier Transform on said column to produce a vector ($\lambda_i$);
    constructing a Diagonal Matrix $D^{(\alpha)}$ utilizing said vector ($\lambda_i$); and
    forming a reconstructed image by the following expression:

$$F^{(\alpha)} = \text{IFFT}[D^{(\alpha)}(\text{FFT}(G))],$$

where FFT is a Fast Fourier Transform and IFFT is an inverse Fourier Transform.

16. The sensor according to claim 15, wherein said Imaging Matrix ($g_{i,j}$) is expressed by:

$$g_{i,j} = \sum_m \sum_n f_{m,n} h_{i-m,j-n} + n_{i,j},$$

where $g_{i,j}$ represents the blurred noisy image, $f_{i,j}$ is a matrix representation of the object, $h_{i,j}$ is a matrix representation the point spread function of the optical system and $n_{i,j}$ is a matrix representation of the noise associated with the imaging data.

17. The sensor according to claim 15, wherein said column is a first column of said Circulant Matrix (H).

18. The sensor according to claim 15, wherein said Diagonal Matrix $D^{(\alpha)}$ is constructed by making the diagonal elements of $D^{(\alpha)}$ equal to a vector $L_{i(\alpha)}$ and all other elements equal to zero, where $L_i^{(\alpha)} = \lambda_i^* / \{|\lambda_i|^2 + \alpha\}$ and $\lambda_i^*$ is the complex conjugate of $\lambda_i$.

19. An optical sensor of the type typically including an optical system for focusing light onto a focal plane, said optical system having a predetermined numerical aperture which provides a corresponding level of spatial resolution, wherein the improvement therewith comprising:
  means for converting the light focused on said focal plane into electrical signals including imaging data; and
  means for processing said imaging data in order to provide a desired level of spatial resolution is substantially higher than said corresponding level of spatial resolution according to a multiple image reconstruction technique including:
    providing an initial value for mixel intensities which is equated to $I_m^{(old)}$;
    calculating pixel energy for all of the images ($E_{p,i}$) by utilizing $I_m^{(old)}$;
    calculating changes in mixel intensities ($\Delta I_m$) by utilizing $E_{p,i}$;
    utilizing the values of $I_m^{(old)}$ as the estimate of the mixel intensities, if said changes in mixel intensities ($\Delta I_m$) does not exceed a specified threshold;
    calculating new mixel intensities ($I_m^{(new)}$ by adding $\Delta I_m$ to $I_m^{(old)}$, if said changes in mixel intensities ($\Delta I_m$) does exceed said specified threshold; and
    equating $I_m^{(old)}$ with said new mixel intensities ($I_m^{(new)}$).

20. The sensor according to claim 19, wherein said pixel energy for all of the images ($E_{p,i}$) is calculated by:

$$E_{p,i} = D_{p,i} - \sum_m \{W_{m,p,i} I_m^{(old)}\},$$

where $D_{p,i}$ is the measured intensity including noise of the $p^{th}$ pixel in the $i^{th}$ image and $W_{m,p,i}$ is a weighting function based on a point spread function of said optical system and any associated atmospheric transmittance.

21. The sensor according to claim 19, wherein said changes in mixel intensities ($\Delta I_m$) is calculated by:

$$\Delta I_m = \alpha \sum_i \sum_p \{W_{m,p,i} E_{p,i}\},$$

where $\alpha$ is an empirically chosen "convergence" parameter and $W_{m,p,i}$ is a weighting function based on a point spread function of said optical system and any associated atmospheric transmittance.

22. An optical sensor of the type typically including an optical system for focusing light onto a focal plane, said optical system having a predetermined Numerical aperture which provides a corresponding level of spatial resolution, wherein the improvement therewith comprising:
  means for converting the light focused on said focal plane into electrical signals including imaging data; and
  means for processing said imaging data in order to provide a desired level of spatial resolution which is substantially higher than said corresponding level of spatial resolution;
  wherein said means for processing utilizes a Non-Linear Reconstruction Technique, wherein said Non-Linear Reconstruction Technique includes determining the values for the S(i)'s which maximize L(s) where $$L(s) = \sum_1 \{D(j)\ln(I(j)) - I(j)\}, \text{ and}$$
$$I(j) = \sum_1 h(j-i)e^{S(i)} \text{ and}$$

S(i) is the vector utilized to generate the object data for i=1, 2, 3 . . . N
$e^{S(i)}$ is the intensity of the ith pixel,
h(j) is the vector function derived from the system's point spread function,
l(j) is the intensity of the j(th) pixel without noise, and
D(j), which is the expression l(j) corrupted by noise, is said imaging data.

23. The sensor according to claim 22 wherein said means for converting the light focused on said focal plane into electrical signals comprises a detector array having at least five detectors spread across the central lobe of the diffraction pattern.

24. The sensor according to claim 22, wherein said means for converting includes a plurality of detectors each having an "instantaneous field of view" that is less than said desired level of spatial resolution.

25. The sensor according to claim 24, wherein said plurality of detectors includes three to five more times the amount of detectors utilized in conventional sensors for a given application.

26. The sensor according to claim 24, wherein each of said detectors has a size no greater than the central diffraction lobe produced by said predetermined Numerical aperture.

27. The sensor according to claim 24, wherein said optical system has a back focal length which is adjusted to enable more than one of said detectors to be spread across the central diffraction lobe produced by said predetermined Numerical aperture.

28. The sensor according to claim 24, wherein said detectors are arranged in a configuration selected from the group consisting of a linear array and a matrix array.

* * * * *